Aug. 14, 1962     T. J. THOMPSON ET AL     3,049,139
CONTROL APPARATUS

Filed Nov. 8, 1956     2 Sheets-Sheet 1

INVENTORS
BILLY S. HEGG
THOMAS J. THOMPSON
BY- R.Y.Brodahl
ATTORNEY

Aug. 14, 1962 T. J. THOMPSON ET AL 3,049,139
CONTROL APPARATUS
Filed Nov. 8, 1956 2 Sheets-Sheet 2

INVENTORS
BILLY S. HEGG
THOMAS J. THOMPSON
BY- R.J.Brodahl
ATTORNEY

United States Patent Office 3,049,139
Patented Aug. 14, 1962

3,049,139
CONTROL APPARATUS
Thomas J. Thompson, Dearborn, Mich., and Billy S. Hegg, South Bend, Ind., assignors to The Bendix Corporation, a corporation of Delaware
Filed Nov. 8, 1956, Ser. No. 621,142
3 Claims. (Cl. 137—48)

The present invention relates in general to fuel control apparatus, and more particularly to fuel control apparatus for an internal combustion engine such as a gas turbine engine or a reciprocating piston engine or the like.

For certain applications of an internal combustion engine, it is desirable to maintain engine speed at a constant value for a given throttle or control member setting so as to prevent engine overspeed or hunting. Heretofore, engine governing has been done primarily with proportional type governing systems which permit engine speed to vary over a given range for a given throttle setting. The extent to which speed varies in a proportional governor system is dependent on the fuel flow requirements of the engine to maintain the engine in a steady state flight. Inasmuch as generally more fuel is required to maintain steady state flight at low altitudes than at high, the attained speed of the engine governed by a proportional type system would be less at low altitude than at high altitude, other factors being the same. In an effort to improve engine speed regulation, isochronous governor devices have been developed which regulate engine speed at a constant value for a given throttle setting regardless of the fuel flow requirements of the engine. Isochronous governor systems have an advantage over proportional type governing systems in that the former regulate a constant engine speed and not an engine speed that varies proportionally with engine fuel requirements.

Accordingly, it is an object of my invention to provide an improved control apparatus for an engine, and more specifically to provide fuel control apparatus which includes an improved stable isochronous engine speed governor device.

It is a different object of the present invention to provide an improved fuel control apparatus, including an improved engine speed anticipation device operative with an engine speed governor device.

It is a further object of the present invention to provide an improved fuel control apparatus, including a governor device having a governor break slope from the acceleration curve to the steady state curve that can be controlled and made more or less steep as may be desired relative to a selected steady state operating speed of the engine.

These and other objects and advantages of the present invention will become apparent in view of the following description taken in conjunction with the drawings wherein.

Figure 1:
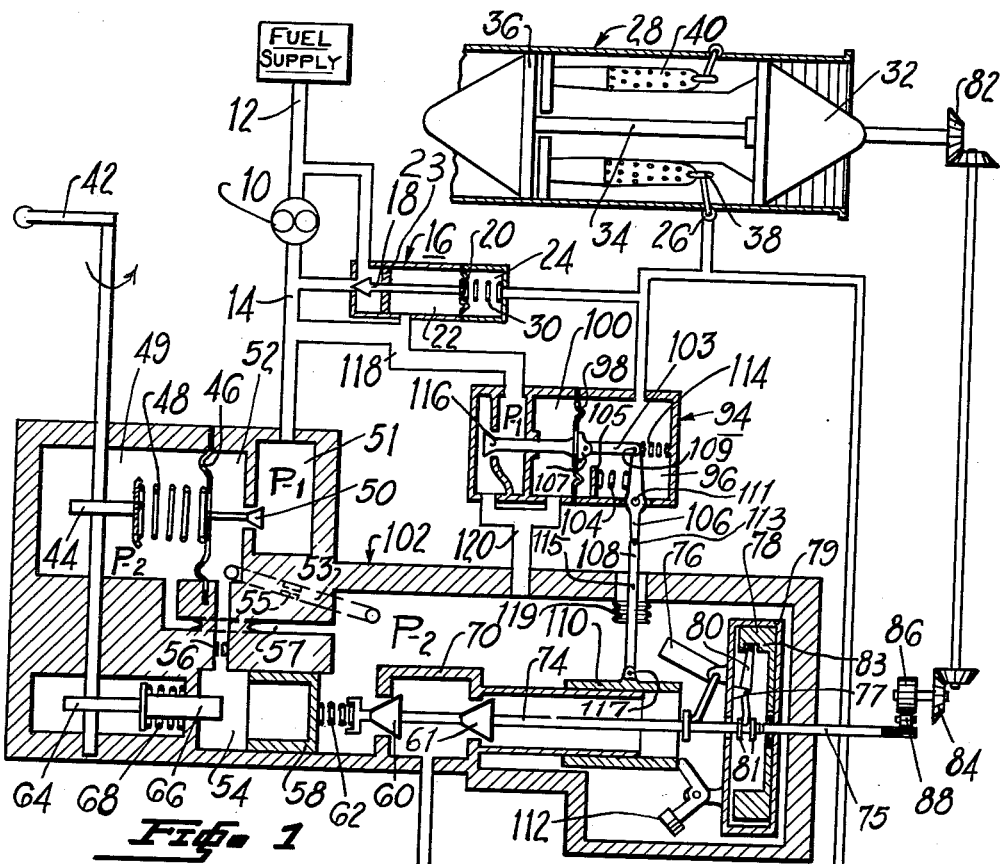
FIGURE 1 is a schematic showing of an engine control apparatus in accordance with the present invention.

Referring to the apparatus shown in FIGURE 1, a fuel pump 10 is provided for supplying fuel from an input fuel conduit 12 to an output fuel conduit 14. The fuel is supplied to the manifold 26 from the conduit 14 by the conduit 118, the valve 116, the conduit 120, the metering valve members 60 and 61 in the chamber 102, and the conduit 72. A by-pass valve 16 is provided, including a valve member 18 which controls the flow of fuel at pump outlet pressure $P_1$ from the output fuel conduit 14 to the input fuel conduit 12, including fuel at pump inlet pressure $P_0$, in response to a control diaphragm 20 which is positioned between a first fluid chamber 22 containing fuel at pump outlet pressure $P_1$ and a second fluid chamber 24 containing fuel at the pressure within the fuel manifold 26 of the gas turbine engine 28 to be controlled. A wall member 23 is provided within bypass valve 16 to provide a barrier between $P_1$ pressure fluid in chamber 22 and $P_0$ pressure fluid downstream of valve 18. The fluid chamber 24 includes a control spring 30. The engine 28 includes a compressor 32 connected through a drive shaft 34 to a turbine 36. The fuel manifold 26 is connected to individual fuel nozzles 38, respectively operative with a plurality of combustion chambers 40. The by-pass valve 16 is operative to regulate the pump outlet pressure $P_1$ within the conduit 14 as a function of the fuel pressure within the fuel manifold 26 and the output force of the control spring member 30.

A control throttle member 42 is operative to position a first control cam member 44 which in turn controls the load applied to a diaphragm 46 through a control spring 48. The diaphragm 46 controls the position of a control valve 50 connected between the fluid chambers 51 and 52, and which determines the fluid pressure within the fluid chamber 52 as a function of the position of throttle member 42 acting through the cam 44 and the control spring 48. The fluid chamber 52 is connected to another fluid chamber 54 through a control orifice or bleed member 56, such that the fluid pressure within the fluid chamber 52 substantially corresponds to the fluid pressure within the chamber 54. A control piston member 58 is responsive to the fluid pressure within fluid chamber 54, and is connected to one end of a shaft 74 which contains metering valve members 60 and 61 through a control spring 62. The throttle member 42 determines the position of a second control cam member 64 which is operative to position a fluid volume displacement member 66 within the fluid chamber 54 and against the action of a control spring 68.

The metering valve members 60 and 61 are operative relative to the sleeve member 70 such that the position of the members 60 and 61 in conjunction with the pressure drop or differential across them is determinative of the fuel flow to the engine 28 through the conduit 72. By utilizing the two valve members 60 and 61 to meter fuel, the forces acting on shaft 74 occasioned by the fuel pressure differential across the valve members can be substantially balanced out so as not to affect the operation of the apparatus. Valve members 60 and 61 comprise an always-open balanced governor or metering valve that is operative to vary area opening between a predetermined minimum and maximum area opening established by limited movement of shaft 74. The control shaft 74 is responsive to the output force of a first speed weight 76 and a rotatable flyweight member or flywheel member 78 through a control arm 80 pivoted at pin connection 77 which is operative between a pair of control shoulders 81 on the control shaft 74 as shown. A second control shaft 75 is rotated corresponding to the speed of the engine 28 by a first set of bevel gears 82 and a second set of bevel gears 84, and a first spur gear 86 and a second spur gear 88 operative with the splined end of the control shaft 75. The rotatable inertia-responsive flywheel 78 is connected to the control shaft 75 by means of housing 79 and arm 80 for rotation therewith. However, the connection with the control shaft 75 allows several rotational degrees of relative movement of the flywheel 78 such that the flywheel 78 is responsive to the changes in the rotational speed of the control shaft 75 due to the inertia or mass of the flywheel 78.

The fuel pressure differential or drop across the metering valve including the valve members 60 and 61 is controlled by a head regulator device 94, including a fluid chamber 96 containing fluid at the pressure of the fuel manifold 26. When the engine is accelerating the regulator device 94 is designed to furnish a greater amount of fuel from the conduit 14, which is at pressure $P_1$, to boost the pressure $P_2$ in the chamber 102 and thereby increase the pressure differential and the fuel flow across the metering valve members 60 and 61. A control diaphragm 98 is positioned between the fluid chamber 96 and a second fluid chamber 100 containing fluid at the pressure of the fuel within the chamber 102 surrounding the metering valve including the valve members 60 and 61. A control link member 103 is connected between the diaphragm 98 and a first lever 106 by pivot pin connections 107 and 109 respectively. Lever 106 is rotatably secured to the housing of regulator device 94 by pivot 111 and is further connected to a second lever 108 by a pin connection 113. Lever 108 is rotatably mounted about pivot support 115 secured to housing 102 and further is pivotally connected to a control member 110 responsive to the output force of a second speed weight 112 by pin 117. A bellows seal 119 is secured to the housing 102 and lever 108 to prevent fuel leakage. A first control spring 104 is positioned between the first lever 106 and an extended arm 105 of the head regulator device 94 as shown, and a second control spring 114 is positioned between the first control lever 106 and the casing of the head regulator device 94. A control valve member 116 is operatively connected to the control diaphragm 98 and determines the flow of fuel from a fuel conduit 118 connected to the pump outlet fuel conduit 14 and the fuel conduit 120 connected to the fuel chamber 102. In this respect the pressure of the fuel within the fuel chamber 102 is controlled as a function of the fuel pressure within the conduit 72 and the output force of the speed weight 112 as applied to the control valve member 116 and the diaphragm 98.

Figure 2:
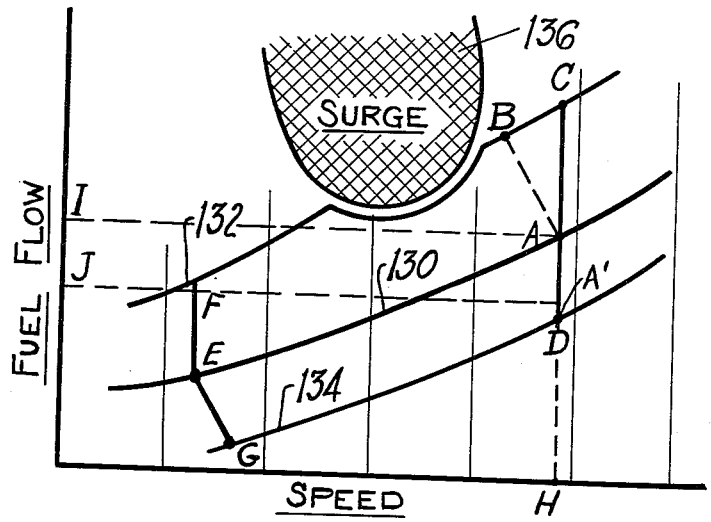
FIGURE 2 is a curve chart illustrating the operation of the control apparatus shown in FIGURE 1.

Referring to FIGURE 2 there is shown a curve chart of fuel flow plotted as a function of engine speed for an engine such as the gas turbine engine 28 shown in FIGURE 1. A first curve 130 represents the fuel required for steady state engine operation. The curve 132 is the acceleration limit curve, and the curve 134 is the deceleration limit curve for the engine. The engine unstable operating region as represented by compressor stall or surge is shown by the cross hatched area 136, and is to be avoided as shown by having the acceleration curve 132 by-pass the surge area 136 as shown in FIGURE 2.

In the operation of the fuel control apparatus as shown in FIGURE 1 in accordance with the present invention if the engine is operating on the acceleration curve 132, and it is desired to have the engine operate in accordance with point A on the steady state curve 130, the speed increases along the acceleration curve 132 until the point B where the flywheel device 78 as shown in FIGURE 1 will become operative such that the engine operation will continue in accordance with the line B—A as shown in FIGURE 2. After the engine is operating at the point A on the steady state curve 130 the operation of the governor apparatus as shown in FIGURE 1 will thereafter be along the line C—D as shown in FIGURE 2, which is the characteristic isochronous governor control curve as well known to persons skilled in this art.

Figure 3:
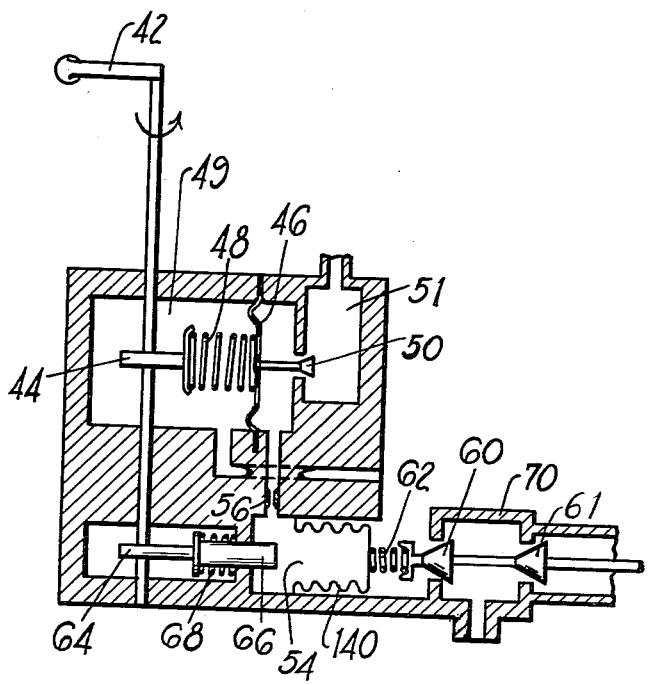
FIGURE 3 is a modification of the control apparatus as shown in FIGURE 1.

In FIGURE 3 there is shown a modification of the fuel control apparatus as shown in FIGURE 1. In the FIGURE 3 modification a pressure responsive bellows member 140 has been substituted for the control piston 58. The bellows member 140 is responsive to the fluid pressure within the chamber 54 and is operative in a manner similar to the control piston 58 to control the position of the metering valve members 60 and 61 as described relative to the apparatus of FIGURE 1. The remainder of the apparatus of FIGURE 3 corresponds to the apparatus as shown in FIGURE 1.

Figure 4:
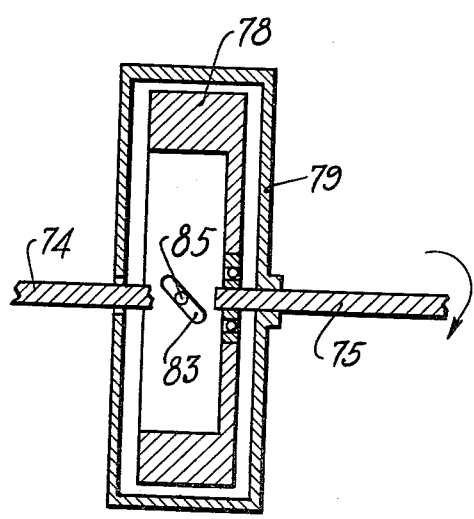
FIGURE 4 is a detailed showing of a portion of the control apparatus as shown in FIGURE 1.

In FIGURE 4 there is shown in detail a portion of the flyweight device 78 as shown in FIGURE 1, including the control shafts 74 and 75. The lever 80, shown in FIGURE 1, has a ball member 85 integrally connected at its upper end and which is operative in an angled slot 83 cut into the flywheel member 78. In FIGURE 4 lever 80 and its engagement with shaft 74 are cut away to show the relative position of ball 85 and slot 83. The slot 83 is positioned at an angle of substantially 45° relative to the axis of the control shafts 74 and 75 such that the anticipation or lag effect of the flyweight 78 due to its mass and the inertia resulting from said mass is operative to load and thereby position the valve members 60 and 61 through the control shaft 74 substantially the same for deceleration of the engine 28 as for acceleration of that engine. As shown in FIGURE 4 a housing 79 surrounds the flywheel 78 and is directly coupled to the control shaft 75. The housing 79 as shown in FIGURE 1 provides a pivot support for the flyweight 76 and the speed responsive flyweight 112 as well as for the control lever 80.

In the operation of the apparatus as shown in FIGURE 1, the by-pass valve 16 is operative to establish the pump output pressure $P_1$ as a function of the fluid pressure within the conduit 72 and the fuel manifold 26 as well as the output force of the control spring 30. Control fuel at pump output pressure $P_1$ is supplied to the fluid chamber 51 and passes into the fluid chamber 52 at a lower pressure $P_2$ plus G as determined by the position of the valve member 50 connected to the control diaphragm 46 in response to control fuel at pressure $P_2$ within the fluid chamber 49 and the position of the throttle member 42 as applied through the control cam 44 and the control spring 48. If the control spring 48 is considered as the governor spring, then the pressure G may be considered as resulting from the force applied to the diaphragm 46 by the spring 48. The control fluid within the chamber 52 is passed to the fluid chamber 54 at substantially the same pressure, through the control orifice 56 which operates as a damper for the control piston 58 to give a high gain system of this type stability. The fluid displacement member 66 is operative to introduce an initial throttle burst movement to the control piston 58 by suddenly displacing a quantity of fluid within the chamber 54 as a function of the position of the throttle member 42 as applied through the control cam 64. The fluid displacement member 66 is operative to give a rapid response to the control piston 58 which would be otherwise prevented by the control orifice 56. The control spring 48 operative with the first control cam 44 is effectively the governor spring, and it acts through the pressure of the control fluid within the fluid chambers 52 and 54 and the control piston 58 to position the metering valve members 60 and 61. Continuous flow of fuel past valve 50 is provided by draining fuel from chamber 52 through passage 53 and into chamber 102 which contains fuel at a lower pressure $P_2$. Orifice 55 in passage 53 limits the flow of fuel from chamber 52 to prevent a substantial reduction of $P_2$ plus G pressure in chamber 52 which might arise if an uncontrolled quantity of fuel were drained into chamber 102. The fuel conduit 57 connected between the fluid chamber 49 and the fluid chamber 102 is provided to introduce control fluid at fuel pressure $P_2$ into the fluid chamber 49 corresponding to the fluid pressure within the chamber 102.

The first speed weight 76 is operative to load and thereby position the metering valve members 60 and 61 as a function of engine speed. The engine acceleration responsive weight member or flywheel 78, for steady state operation of the engine 28, does not introduce any appreciable control force to position the metering valve members 60 and 61, since there is no inertia displacement of the acceleration responsive member 78 for steady state operation of the engine 28. However, for acceleration or deceleration of the engine where there is a speed change, the weight member 78 is responsive as a lag or lead member due to the inertia of its mass, and it introduces a control force to position the valve members 60 and 61 which control force is operative as an anticipating force such that the governor break from the acceleration curve to the steady state curve 130 as shown in FIGURE 2 by the line B—A is effectively anticipated.

In the operation of the apparatus of FIGURE 1 in accordance with the fuel flow vs. speed functions shown in FIGURE 2, if the engine is operating in accordance with steady state curve 130 at a relatively low speed as illustrated by point E, and it is desired to have the engine operate in accordance with point A also on curve 130, the engine operator advances the throttle 42 position to a speed setting corresponding to the abscissa of point A. This positions control piston 58 rapidly to the right in response to displacement member 66 and valve 50. At the same time spring 48 is compressed applying an increased load on diaphragm 46 which opens valve 50 and permits the fluid pressure in chamber 54 to increase to a value sufficient to maintain the new position of piston 58. The increased load on shaft 74 occasioned by piston 58 causes shaft 74 and the valve elements 60 and 61 to move to the right to a wide open position determined by contact of shaft 74 with shaft 75 or other suitable maximum stop means. The fuel flow into conduit 72 is determined by the fixed wide open area of the valve members 60 and 61 and the pressure drop across said valve members as determined by head regulator device 94 and is represented by point F on curve 132 in FIGURE 2. Inasmuch as fuel flow at point F is in excess of the requirements to maintain steady or constant speed as represented by curve 130, engine speed will increase. As engine speed increases, head regulating device 94 will be controlled by speed weight member 112 through linkage 108 and 106 to open valve 116 and increase the pressure drop across metering valve members 60 and 61 causing increased fuel flow in accordance with curve 132 until the point B is reached. At point B the combined force outputs of weight member 76 and the anticipation flywheel 78 is sufficient to begin overcoming the increased load applied by control piston 58 and to start moving valve members 60 and 61 in a closing direction until point A is obtained where the system is again in balance.

Steady state operation occurs along vertical line C—D and it should be noted that any changes in fuel flow requirement between points C and D would not cause a corresponding speed change. Assume the engine is operating at point A on FIGURE 2 and burning fuel in a quantity represented by the point I to maintain a speed represented by the point H. If engine operating conditions change such that the fuel indicated at point J is now required to maintain steady state flight, the engine will be momentarily overfueled causing the speed weight 76 in FIGURE 1 to move shaft 74 to the left. Leftward movement of shaft 74 will tend to close valve members 60 and 61, thus reducing the fuel flow. Leftward movement of shaft 74 will also compress the spring 62 and apply an increased load on piston 58. Inasmuch as the fluid in chamber 54 is at constant value as determined by the throttle setting, piston 58 will move to the left elongating spring 62 back to its original length. Thus as the engine operates at a new steady state point A' the speed and, consequently, the force output of weight 76 remains the same and the balancing force applied by spring 62 remains the same due to the movement of piston 58, but shaft 74 has moved to the left moving valve members 60 and 61 in a fuel flow decreasing position. If engine operating conditions should change so as to require increased fuel flow, substantially the reverse of the above procedure would occur. Speed would momentarily slow down, decreasing the load on spring 62 and allow piston 58 and shaft 74 to move to the right, increasing fuel flow. Speed would increase with the increased fuel flow until the same value of speed had been obtained as was held prior to the change in engine conditions.

Deceleration of the engine is substantially the reverse of the acceleration operation. If the throttle member were decreased from a relatively high to a relatively low speed setting, fluid pressure in chamber 54 would decrease allowing valve members 60 and 61 to assume a minimum area opening position and decrease fuel flow from the steady state point A to the point D on the deceleration curve. Inasmuch as the fuel flow at point D is less than that recorded to maintain steady state operation, the engine will begin to decelerate. As engine speed decreases, head regulating valve 116 will close reducing the pressure differential across valve members 60 and 61 and further reducing the fuel supply to the engine according to the curve 134 illustrated in FIGURE 2. At the point G in FIGURE 2 the combined force outputs of speed weight member 76 and flyweight 78 begins to be overcome by spring 62 and valve members 60 and 61 begin to open and increase fuel flow until the new steady state point represented at point E on FIGURE 2 is reached.

In the operation of the apparatus shown in FIGURE 3 the fluid pressure responsive bellows member 140 is operative in a manner similar to the control piston 58 previously described, and the rest of the apparatus operates in the manner similar to that shown and described relative to the apparatus of FIGURE 1.

Relative to the apparatus shown in FIGURE 4, for a clockwise rotation of the control shaft 75, as viewed from the right side of FIGURE 4, at a speed corresponding to the rotational speed of the engine 28 as shown in FIGURE 1, a deceleration of the engine will cause the flyweight 78 to lead the control shaft 75 such that the ball member 85 will ride upward and to the left of the control slot 83 of the flyweight 78 such that the control lever 80 as shown in FIGURE 1 will apply a control force to the control shaft 74 and hence the valve members 60 and 61 to move them to the right as shown in FIGURE 1. Similarly for an acceleration of the engine, the flyweight 78 due to its inertia will lag the control shaft 75 resulting in the ball member 85 being moved along the control slot 83 to the right and in a downward direction such that a control force will be applied thereby to the control shaft 74 and the metering valve member 60 in a direction to move the valve member 60 to the left as shown in FIGURE 1.

Although the present invention has been described with a certain degree of particularity it should be understood that the present disclosure has been made only by way of example and that numerous changes in the details of construction and the combination and arrangement of parts may be resorted to without departing from the scope and spirit of the present invention.

We claim:

1. Governor apparatus for an engine comprising: a fuel supply valve, a governor flyweight device connected to said fuel valve to apply a force thereto tending to close said fuel valve, a fluid chamber, a movable piston member slidably disposed in said chamber to define a movable wall thereof, connecting means interconnecting said piston means and said fuel valve to transmit a force to said fuel valve tending to move said fuel valve in an open direction, passage means connected to said chamber for supplying a pressurized control fluid thereto, a movable throttle member, a control valve member operative with said passage means to control fluid pressure supplied to said fluid chamber, a fluid pressure responsive member having two sides connected to said control valve for controlling the position thereof, a spring member operatively connected to said fluid pressure responsive member and said throttle member to produce a force acting on said pressure responsive member that varies with the position of said throttle member, and means fluidly interconnecting one side of said fluid pressure responsive member to said fluid chamber to apply a fluid pressure force thereto that opposes the force produced by said spring member.

2. Governor apparatus as claimed in claim 1 wherein said piston member has an internal side within said fluid chamber and an external side without said fluid chamber and a fluid pressure acting on said external side, said apparatus including a conduit interconnecting another side of said fluid pressure responsive member with fluid pressure acting on the external side of said piston member.

3. Governor apparatus as claimed in claim 1 including a restrictive damping bleed in said passage means operative to retard pressure variations in said fluid chamber, and said connecting means is comprised of a resilient spring member.

References Cited in the file of this patent

UNITED STATES PATENTS

| | | |
|---|---|---|
| 2,422,808 | Stokes | June 24, 1947 |
| 2,691,268 | Prentiss | Oct. 12, 1954 |
| 2,761,495 | Greenland | Sept. 4, 1956 |
| 2,855,029 | Eastman | Oct. 7, 1958 |
| 2,856,175 | Martz | Oct. 14, 1958 |